(12) United States Patent
Dormieux et al.

(10) Patent No.: US 11,595,736 B2
(45) Date of Patent: Feb. 28, 2023

(54) MEDIA PLAYER

(71) Applicant: Playrcart Limited, London (GB)

(72) Inventors: Glen Dormieux, London (GB); Richard Mason, London (GB)

(73) Assignee: Playrcart Limited, London (GB)

( * ) Notice: Subject to any disclaimer, the term of this patent is extended or adjusted under 35 U.S.C. 154(b) by 0 days.

(21) Appl. No.: 17/370,233

(22) Filed: Jul. 8, 2021

(65) Prior Publication Data
US 2022/0021948 A1    Jan. 20, 2022

Related U.S. Application Data

(60) Provisional application No. 63/053,061, filed on Jul. 17, 2020.

(51) Int. Cl.
*H04N 21/81* (2011.01)
*G06F 3/0483* (2013.01)
(Continued)

(52) U.S. Cl.
CPC ....... *H04N 21/8113* (2013.01); *G06F 3/0483* (2013.01); *G06Q 30/0641* (2013.01);
(Continued)

(58) Field of Classification Search
CPC ........... H04N 21/4312; H04N 21/4722; H04N 21/812; H04N 21/43074; H04N 21/431;
(Continued)

(56) References Cited

U.S. PATENT DOCUMENTS

| | | | | |
|---|---|---|---|---|
| 6,889,325 B1 * | 5/2005 | Sipman | ................. | H04L 63/126 380/37 |
| 8,190,435 B2 * | 5/2012 | Li-Chun Wang | ....... | G10L 15/26 704/270 |
| 8,290,423 B2 * | 10/2012 | Wang | .................... | H04B 17/23 455/2.01 |

(Continued)

OTHER PUBLICATIONS

European Search Report for EP20192947 dated Dec. 18, 2020, 2 pages.

(Continued)

*Primary Examiner* — Michael B. Pierorazio
(74) *Attorney, Agent, or Firm* — Kilpatrick Townsend & Stockton LLP

(57) ABSTRACT

The present invention provides a media player configurable to provide the user with a seamless way of conducting transactions from within a window of the media player itself. All intermediate steps relating to the required transaction are carried out by calling up relevant modules/applications from within the application libraries from within an e-commerce platform. In preferred embodiments, the media player is configured to retrieve an encoded media file from a server or other content delivery network (CDN). The media player is further configured to display predefined overlays to the user during playback of the media file in response to identifying cues encoded into the media file by the content owner. The content owner can upload the media files to a server or other CDN via a dashboard/user interface. The cues can be encoded with a plurality of fields to enable the desired functionality to be achieved.

19 Claims, 7 Drawing Sheets

(51) Int. Cl.
  *G06Q 30/0601* (2023.01)
  *H04N 21/431* (2011.01)
  *H04N 21/443* (2011.01)
  *H04N 21/478* (2011.01)
  *H04N 21/845* (2011.01)

(52) U.S. Cl.
  CPC ..... *H04N 21/4312* (2013.01); *H04N 21/4431* (2013.01); *H04N 21/47815* (2013.01); *H04N 21/8193* (2013.01); *H04N 21/845* (2013.01)

(58) Field of Classification Search
  CPC ......... H04N 21/4431; H04N 21/47815; H04N 21/488; H04N 21/8113; H04N 21/8193; H04N 21/845; G06Q 30/0641; G06F 3/0483
  USPC .......................................................... 725/37
  See application file for complete search history.

(56) References Cited

U.S. PATENT DOCUMENTS

| | | | | |
|---|---|---|---|---|
| 8,650,603 | B2* | 2/2014 | Doets | H04N 21/25891 725/38 |
| 8,688,600 | B2* | 4/2014 | Barton | G06Q 30/0601 84/603 |
| 8,725,829 | B2* | 5/2014 | Wang | G06Q 30/06 704/239 |
| 8,811,885 | B2* | 8/2014 | Wang | H04H 60/44 455/2.01 |
| 9,113,215 | B1* | 8/2015 | Berry, III | H04N 21/23412 |
| 9,338,499 | B2 | 5/2016 | Briggs et al. | |
| 9,832,532 | B1 | 11/2017 | Agabob et al. | |
| 10,846,732 | B1* | 11/2020 | Kunert | H04N 21/812 |
| 2002/0072982 | A1* | 6/2002 | Barton | G06Q 30/0625 705/14.1 |
| 2002/0083060 | A1* | 6/2002 | Wang | G11B 27/28 |
| 2004/0199387 | A1* | 10/2004 | Wang | G06Q 30/06 704/E15045 |
| 2005/0028195 | A1* | 2/2005 | Feinleib | H04N 7/163 725/135 |
| 2005/0091274 | A1* | 4/2005 | Stanford | G06F 16/9577 |
| 2005/0192863 | A1* | 9/2005 | Mohan | G06Q 30/02 705/14.27 |
| 2005/0209917 | A1* | 9/2005 | Anderson | G06Q 30/0214 705/14.16 |
| 2006/0195359 | A1* | 8/2006 | Robinson | G06Q 30/0236 705/14.19 |
| 2006/0224452 | A1* | 10/2006 | Ng | G06Q 30/0226 705/14.27 |
| 2006/0256133 | A1* | 11/2006 | Rosenberg | G06F 3/013 345/619 |
| 2007/0124756 | A1* | 5/2007 | Covell | H04N 21/858 348/E7.071 |
| 2007/0130580 | A1* | 6/2007 | Covell | H04N 21/4782 725/18 |
| 2007/0143778 | A1* | 6/2007 | Covell | H04N 21/4788 725/135 |
| 2007/0179850 | A1* | 8/2007 | Ganjon | G06Q 30/0236 705/14.27 |
| 2007/0192784 | A1* | 8/2007 | Postrel | H04N 21/4316 725/23 |
| 2007/0214049 | A1* | 9/2007 | Postrel | H04N 21/475 725/32 |
| 2008/0052062 | A1* | 2/2008 | Stanford | G10L 15/26 704/E15.045 |
| 2009/0198701 | A1* | 8/2009 | Haileselassie | G06F 16/9535 |
| 2009/0313670 | A1* | 12/2009 | Takao | H04N 21/47 725/110 |
| 2010/0034466 | A1* | 2/2010 | Jing | G06F 16/50 382/195 |
| 2010/0114713 | A1* | 5/2010 | Anderson | G06Q 20/10 705/14.69 |
| 2011/0231878 | A1 | 9/2011 | Hunter et al. | |
| 2011/0273455 | A1* | 11/2011 | Powar | G11B 27/10 345/473 |
| 2012/0011545 | A1* | 1/2012 | Doets | H04N 21/8153 725/38 |
| 2012/0076310 | A1* | 3/2012 | DeBusk | H04H 60/58 381/56 |
| 2012/0084811 | A1* | 4/2012 | Thompson | H04N 21/812 725/34 |
| 2012/0124608 | A1* | 5/2012 | Postrel | G06Q 30/0215 725/23 |
| 2012/0167145 | A1 | 6/2012 | Incorvia | |
| 2012/0191231 | A1* | 7/2012 | Wang | G06F 16/7834 700/94 |
| 2012/0221131 | A1* | 8/2012 | Wang | G06F 16/634 700/94 |
| 2012/0244949 | A1* | 9/2012 | Redling | H04N 21/812 463/42 |
| 2012/0295560 | A1* | 11/2012 | Mufti | H04B 13/00 455/95 |
| 2012/0297400 | A1* | 11/2012 | Hill | G06F 9/445 719/318 |
| 2012/0316969 | A1* | 12/2012 | Metcalf, III | G06Q 30/0269 705/14.66 |
| 2012/0317240 | A1* | 12/2012 | Wang | H04H 60/37 709/219 |
| 2013/0010204 | A1* | 1/2013 | Wang | H04H 20/88 348/725 |
| 2013/0029762 | A1* | 1/2013 | Klappert | A63F 13/792 463/31 |
| 2013/0031579 | A1* | 1/2013 | Klappert | H04N 21/454 725/32 |
| 2013/0042262 | A1* | 2/2013 | Riethmueller | H04N 21/25866 725/14 |
| 2013/0044051 | A1* | 2/2013 | Jeong | H04N 21/44218 345/156 |
| 2013/0067512 | A1* | 3/2013 | Dion | G06Q 30/0251 725/32 |
| 2013/0073366 | A1* | 3/2013 | Heath | G06Q 30/0261 705/14.25 |
| 2013/0073377 | A1* | 3/2013 | Heath | G06Q 30/02 705/14.39 |
| 2013/0074121 | A1* | 3/2013 | Berry, III | H04N 21/25841 725/35 |
| 2013/0080242 | A1* | 3/2013 | Alhadeff | G06F 16/957 705/14.39 |
| 2013/0080262 | A1* | 3/2013 | Scott | G06Q 30/02 705/14.68 |
| 2013/0085828 | A1* | 4/2013 | Schuster | G06Q 30/0207 705/14.39 |
| 2013/0111519 | A1* | 5/2013 | Rice | G06Q 30/02 725/34 |
| 2013/0124073 | A1* | 5/2013 | Ren | G08G 1/00 701/118 |
| 2013/0212477 | A1* | 8/2013 | Averbuch | H04N 21/812 715/719 |
| 2014/0214532 | A1* | 7/2014 | Barton | G06Q 30/0251 705/26.62 |
| 2014/0278845 | A1* | 9/2014 | Teiser | H04N 21/812 705/14.4 |
| 2015/0026728 | A1 | 1/2015 | Carter et al. | |
| 2015/0120767 | A1* | 4/2015 | Skeen | H04N 21/00 707/754 |
| 2015/0208131 | A1* | 7/2015 | Chatter | H04N 21/8133 725/60 |
| 2016/0182969 | A1* | 6/2016 | Berry, III | H04N 21/2187 725/36 |
| 2018/0343481 | A1 | 11/2018 | Loheide et al. | |
| 2019/0182562 | A1* | 6/2019 | Peng | H04N 21/478 |
| 2021/0168435 | A1 | 6/2021 | Korn et al. | |

OTHER PUBLICATIONS

International Search Report for PCT/GB2021/051735 dated Oct. 27, 2021, 4 pages.

(56) References Cited

OTHER PUBLICATIONS

United Kingdom Search Report for GB2013030.8 dated Feb. 5, 2021, 2 pages.

* cited by examiner

MEDIA PLAYER

CROSS-REFERENCE TO RELATED APPLICATION

This application claims priority to U.S. Provisional Patent Application No. 63/053,061, filed on Jul. 17, 2020, entitled "A Media Player," the disclosure of which is hereby incorporated by reference in its entirety for all purposes.

BACKGROUND TO THE INVENTION

The increase in the use of and reliance on multimedia platforms has led to an increased focus on utilising these platforms to advertise and sell products and services to the end user. Conventionally, the user would identify a product or service of interest within the player window and would then be required to locate the product or service via separate searches using a browser or through the use of embedded hyperlinks which redirect the user to the appropriate page of a website where the user can then complete the required transaction. In both cases, the user is necessarily directed away from the media player window and the associated content displayed there.

SUMMARY OF THE INVENTION

According to a first aspect of the present invention, there is provided a method for playback of media files on a media player, comprising the steps of: retrieving a media file from a file location; initiating playback of the media file and displaying content on a media player display; detecting a first encoded cue at a location in the media file; displaying an interaction overlay element associated with the first encoded cue on the media player display while the media file is playing; detecting a user input associated with the interaction overlay element; and, initiating the display of a transaction overlay element for detecting further user inputs within the media player display.

The method can further detect a second encoded cue at a subsequent location in the media file and remove the interaction overlay element from the media player display in response to detecting the second encoded cue.

In one or more embodiments, the playback of the media file is paused when a user input associated with the interaction overlay element is detected.

In one or more embodiments, the playback of the media file is resumed upon completion or termination of a transaction within the media player display.

In one or more embodiments, the interaction overlay element is associated with the displayed content of the media file.

In one or more embodiments, the transaction overlay element is an e-commerce transaction interface.

In one or more embodiments, the transaction overlay element relates to a transaction consisting of one or more of: a data submission form, purchasing an item, making a booking, making a donation, and registering for a service.

In one or more embodiments, the media file is one of a music video, a film, an advertisement, and a video clip.

In one or more embodiments the media file is a rich media file.

In one or more embodiments, the first encoded cue includes one or more of an interaction overlay element title, a transaction type, a product/service identifier, a start time for displaying interaction overlay, and an end time to stop displaying the interaction overlay element.

In one or more embodiments, the first encoded cue includes metadata tags which identify one or more of an external integration module, a commerce API, a content API, a payment provider, and a content delivery network.

In one or more embodiments the metadata is encoded using FFmpeg software together with a JSON string encoding scheme.

In one or more embodiments the media player is configured to communicate with one or more external transaction services. Preferably, the one or more external transaction services includes a payment provider.

In one or more embodiments the one or more external transaction services includes an order fulfilment service provider.

According to a second aspect of the present invention there is provided a computer program product comprising instructions for performing the method of the first aspect of the invention.

According to a third aspect of the present invention, there is provided a system configured for playback of media files, the system comprising: a media file editor module for encoding cues at one or more locations within a media file, the encoded cues being configured to couple to one or more service modules for causing an interaction overlay element to be displayed within a media player during playback of the media file to facilitate transactions within the media player; and, a media player comprising computer executable instructions for performing the method of the first aspect of the present invention.

In one or more embodiments the system further comprises one or more service integration modules selected from a commerce API, a content API, a payment provider, and a content delivery network.

In one or more embodiments of the system the interaction overlay element is associated with the displayed content of the media file.

In one or more embodiments the interaction overlay element is configured to communicate with one or more external transaction services in response to user input to display a transaction overlay element within the media player.

In one or more embodiments of the system the transaction overlay element is an e-commerce transaction interface.

In one or more embodiments of the system the transaction overlay element relates to a transaction consisting of one or more of: a data submission form, purchasing an item, making a booking, making a donation, and registering for a service.

In one or more embodiments of the system the encoded cue includes one or more of an interaction overlay element title, a transaction type, a product/service identifier, a start time for displaying interaction overlay, and an end time to stop displaying the interaction overlay element.

In one or more embodiments of the system the encoded cue includes metadata tags which identify one or more of a commerce API, a content API, a payment provider, and a content delivery network.

In one or more embodiments the media file editor module is adapted to encode the cue in the media file using FFmpeg software together with a JSON string encoding scheme In one or more embodiments of the system the media player is configured to communicate with one or more external transaction services.

In one or more embodiments of the system the media file is a rich media file.

BRIEF DESCRIPTION OF THE DRAWINGS

An example of the present invention will now be described in detail with reference to the accompanying drawings, in which.

DETAILED DESCRIPTION

Figure 1:
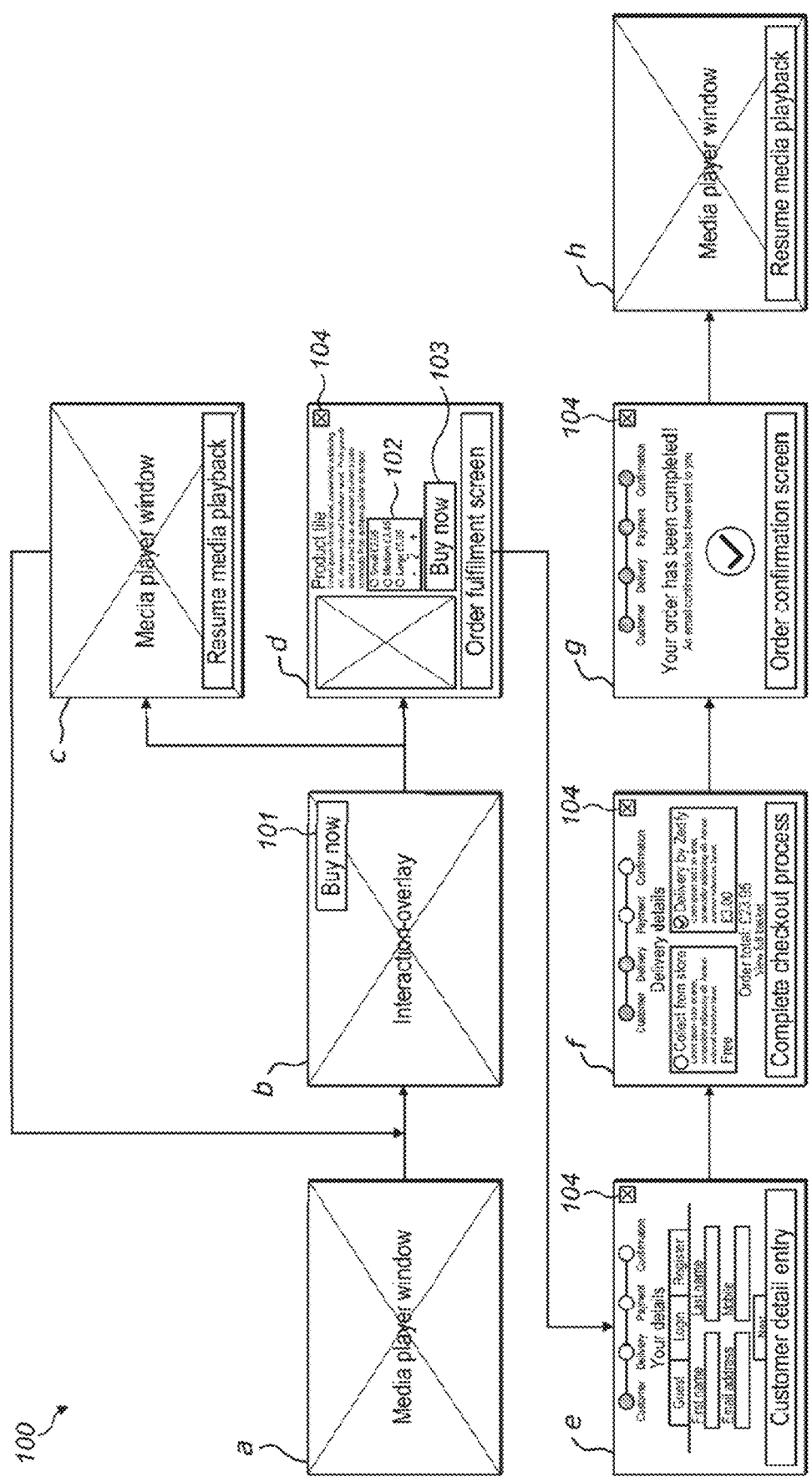
FIG. 1 shows an example of a sequence of window views (a) to (h) displayed within a media player window during the playback of an encoded media file.

The present invention provides a media player configurable to provide the user with a seamless way of conducting transactions from within a window/display of the media player itself. All intermediate steps relating to the required transaction are carried out by calling up relevant modules/applications from within the application libraries from within an e-commerce platform without redirecting the user to alternate webpages and without the need for loading additional displays, windows or tabs. The window or display of the media player can be considered as being the page on which the media content is being displayed to the user. Alternatively, the window or display of the media player may consist of a dedicated tab within a window or tab. The media content may be played back via dedicated software that is run within the given window or tab. The transaction that is conducted upon detection of user interaction with the displayed media content can be completed within the same window or tab in which the media content is being displayed without the need to load any additional windows or tabs. This allows for the user to complete the transaction in a seamless way utilising only minimal additional computer resources. In summary, when completing the transaction, the user will not be redirected to a different window or tab and the transaction can be completed using an overlay element that is presented over the media content in the same display window or tab.

In preferred embodiments, the media player is configured to retrieve an encoded media file from a server or other content delivery network (CDN). The media player is further configured to display predefined overlays to the user during playback of the media file in response to identifying cues encoded into the media file by the content owner. The content owner can upload the media files to a server or other CDN via a dashboard/user interface. The cues can be encoded with a plurality of fields to enable the desired functionality to be achieved.

The encoded cues may include metadata tags which define a plurality of parameters for identifying the media file itself for defining playlists and can also define various parameters to define the various actionable icons. The metadata relating to the type of action for each actionable icon also directs the media player to the relevant interaction overlay element to display and towards any necessary application libraries and external applications required to complete the relevant functions. The metadata for the encoded cues also defines the start times and stop times for displaying the actionable icon as well as details relating to any products/services being offered to the user.

In preferred embodiments, the media player window is configured to display to the user an actionable icon via a predefined overlay rendered over the playback of the video. The media player is further configured to display to the user the progress of the transaction via another predefined overlay which directs the platform to call the relevant modules/applications required to provide the required functionality. Once the transaction has been completed the user is returned to the media file at the point at which the transaction was initiated to provide for a seamless and intuitive experience.

In preferred embodiments, the media player is configured to display an actionable icon within the media player window at predefined times which are defined by the content owner (or their proxy) via a dashboard/portal interface when uploading the media file for storage and subsequent retrieval. The actionable icon is presented by using a predefined interaction overlay element which can display an icon with the required action, for example "Buy", "Book" or "Donate". It will be appreciated that the transaction may alternatively include registering for subscription services or filling out questionnaires, entering competitions or any other action which requires further input from the user. The relevant modules/applications required to fulfil those actions are identified when the cues are added to the media file.

FIG. 1 shows an example of a sequence of views (a) to (h) of the window of a media player which are displayed during the playback of and interaction with an encoded media file. The example of FIG. 1 is specifically directed towards making purchases during the playback of a media file and the window views outlined in FIG. 1 display the various stages of completing the transaction. For alternative functions different intermediate stages would be displayed.

The display of the media player is reconfigured upon detection of the encoded cues during playback of the encoded media file. The media player can be any existing media player on any platform with a dedicated plug in, or alternatively can be a standalone player which replaces an existing player on a website. Alternatively, the media player maybe configured to be incorporated into any one of a plurality of content streaming devices such as smart TVs.

Upon playback of an encoded media file, the window displays the selected content as in window (a). The content can be selected by searching the media library or selecting from a carousel or other selection method that displays the file data. The media file metadata can include the file name and/or a thumbnail of the file to enable displaying the files to the user to aid file selection.

During playback and upon detecting an encoded cue, the media player is configured to display a suitable predefined interaction overlay element (window (b)) presenting to the user an actionable icon 101 such as a "Buy Now" or "Book" or "Donate" button. All parameters relating to the actionable icon are defined by the content owner during the uploading of the media file to the CDN/database.

The interaction overlay element can be configured to cover the entire window or only a part of the window and can be semi-transparent or have sections which are transparent in order to avoid completely obscuring the playback of the media file to allow continued viewing of the media content. Each overlay can be tailored by the content owner or one of a pre-set number of overlays associated with each action can be selected for ease of use. Parameters of the overlay that can be tailored include one or more of the colour schemes, the font, the specific icon parameters as well as incorporating the content owner branding within the overlay if desired.

If no interaction by the user is detected during the defined duration, the media player is configured to remove the interaction overlay element (window (c)) and continue to play the media file until a subsequent cue is detected.

If during the display of the interaction overlay element the user interacts with the actionable icon 101, the media player is configured to replace the interaction overlay element with a subsequent transaction overlay element to allow the user to input details to complete the subsequent action. User interaction includes one clicking, hovering over, or other defined actions (which can be described in the interaction overlay element).

The transaction overlay element in windows (d) to (g) in FIG. 1 display a checkout process for completing a transaction. The transaction overlay element also allows the user to cancel the transaction by selecting a cancel icon 104 anytime during the checkout procedure which returns the user back to the playback of the media file.

As shown in the figures, the media player presents the transaction overlay element in the same media player window as the media file is displayed, thereby avoiding the need for additional resources such as memory or processing power, as well as providing a much more intuitive experience for the user. The transaction overlay element is configured to enable the user to enter the required data for completing one of a plurality of predefined actions such as for example completing a purchase, making a donation, making a booking, or any other action requiring the completion of a data submission form. The transaction overlay element presented for the alternative actions will be specific to the action selected.

The media player is configured to process the desired transaction using any one of a plurality of existing fulfilment services and to render the progress of the transaction to the user within the transaction overlay element so as to avoid the need to navigate through additional windows which again saves on resources and provides a much more intuitive experience.

Once the desired action is completed, this is communicated to the user via the transaction overlay element and the reconfigurable media player is configured to remove the overlays and resume playback of the media file (window (h)).

Alternatively, if the media file was a dedicated advert the media file may be encoded such that upon completion of the transaction the media player can move onto the next file in a playlist or alternatively present the user with a number of related media files for the user to select from upon returning to the media player window.

Figure 2:
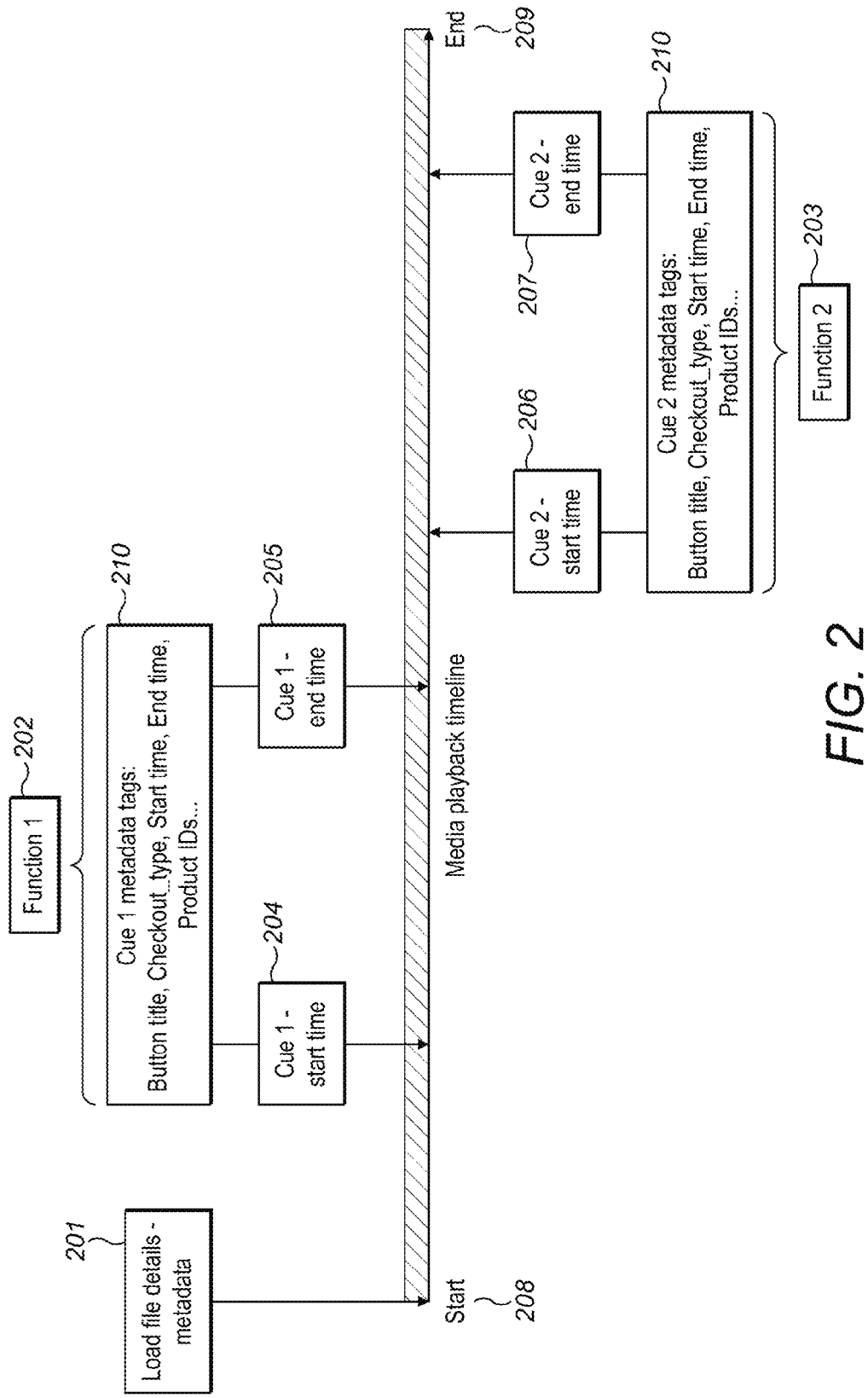
FIG. 2 shows an example of a method for identifying times and functions of specific cues to be encoded within a media file before storage for subsequent retrieval and playback.

FIG. 2 shows an example of a method for identifying times and functions of specific cues to be encoded within a media file before storage for subsequent retrieval and playback. A file metadata 201 is added to the beginning of the media file 208 and various functions are added at identified times during the playback and encoded onto the media file before being stored in on the CDN database. The content owner can select points during the media file where cues are to be added 202, 203. FIG. 2 shows an example with only 2 separate cues but it will be appreciated that any number of cues can be encoded during a media file and the multiple cues can each have the same or different functions associated with them.

Each cue identifies a start time 204, 206 and an end time 205, 207. The multiple cues can also be encoded concurrently and do not need to be spaced apart. The cues can also be encoded at the start or end of the media file and configured to last for any length of time between the start and end of the media file. A cue can also be configured such that the interaction overlay element is displayed for a duration of time that extends beyond the end of the media file.

FIG. 2 identifies a range of metadata tags 210 associated with the actionable icon including, button title, checkout-type, start time, end time, product IDs, the metadata tags can also include the icon location, icon size, icon animation, and icon tracking.

Figure 3:
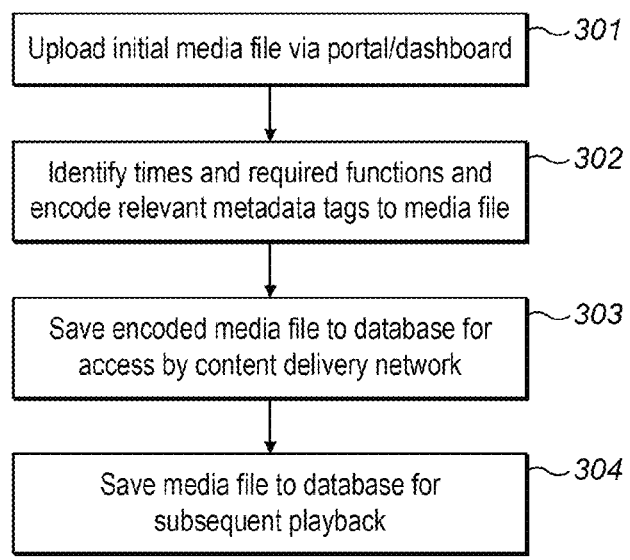
FIG. 3 shows a flow diagram outlining a process of uploading, encoding and storing the media file for subsequent retrieval.

FIG. 3 shows an example flow diagram outlining a process of uploading, encoding and storing the media file for subsequent retrieval. The process for encoding the media file is achieved by using a user accessible portal/dashboard to upload the initial media file 301. The times and required functions for each cue is identified and added to the relevant point in the media file 302. The metadata tags are configured to direct the media player to use the relevant content and application libraries during playback to achieve the required functionality. The encoded media file is stored to a database for access by the CDN. The encoded media file is stored for later retrieval and playback 304.

Figure 4:
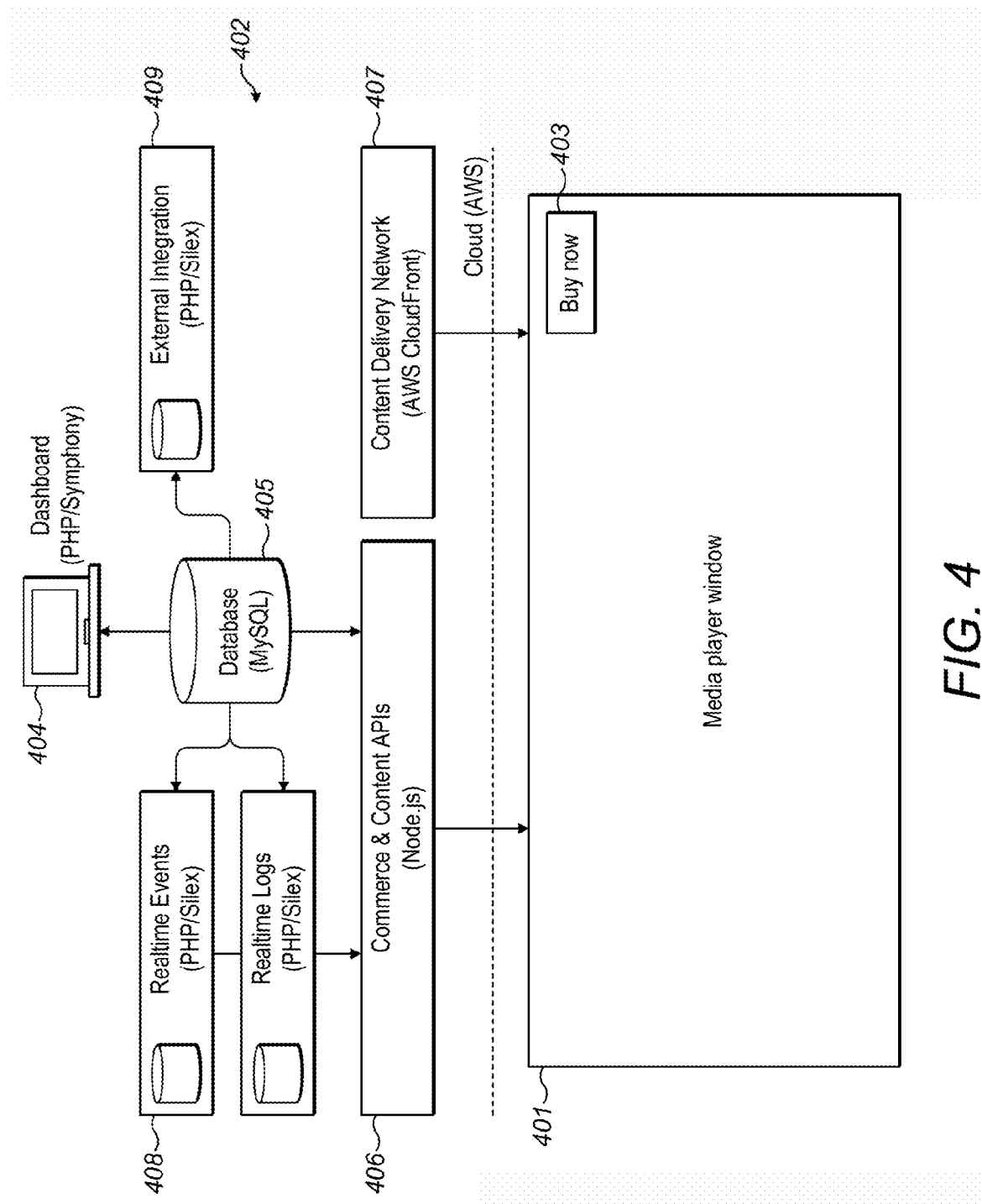
FIG. 4 shows an example of a media player configured to interact with external e-commerce applications via a video commerce platform architecture.

FIG. 4 shows an example of a media player window 401 and how it is configured to interact with external applications via a video e-commerce platform architecture 402. The platform architecture facilitates the arrangement of the various modules and external applications to enable the required actions upon interacting with the actionable icon 403 in the media player window 401. FIG. 4 also shows a user dashboard 404 which can be used to upload and edit the initial media file before storing the encoded media file in a database 405. The required media file is retrieved from the database via the CDN 407. The metadata tags added to the encoded media files are linked to the external modules 408, 409 via the e-commerce and content APIs 406. This can be achieved using hyperlinks or other alternatives which cause the required application to be launched upon the actionable icon being selected in the media player window.

The embodiment shown in FIG. 4 allows content owners to have secure access to the database that stores their content so they can upload and edit the media content as required. For instance, different products may be added to an existing media file or a product/service may no longer be available and needs to be removed. The database can be stored on any number of local servers or cloud storage providers.

The database is updated by way of a dashboard/user interface or other user accessible portal. Access to the secure servers allows new content to be uploaded or existing content to be edited by the content owner alone, different content owners may have access to different databases or secure parts of the same database. The dashboard can also provide the content owner a suite of video editing functions to enable the content owner to modify their media file before uploading. The content owner may also encode the videos offline using suitable encoding and subsequently upload the encoded media files via the dashboard/user interface.

The content owner can use the dashboard to crop, trim, rotate, or otherwise edit the media files and also identify points during the media file at which to encode the cues that allow for user interaction and completion of a range of predefined actions. Once the file has been edited and encoded, the encoded file is saved and stored in the database with a range of associated metadata to identify the file. This metadata can include one or more of: video ID, title, synopsis, date/time, priority (for ordering), booking ID, image (preview), source of video file, start time, and search.

FIG. 4 also illustrates the use of APIs 406. These are pre-existing applications which can provide the required functionalities in the background without the user having to navigate to those individual pages. In the example of a purchase, the user would not be required to navigate to the merchant web site to place the order and would not subsequently be required to navigate to a separate web page to complete payment etc. This is especially convenient when product placement type advertisements are used, where navigating away from the content would not be desirable. The use of APIs also provides for a more robust and reliable system which can ensure high availability, high scalability, reliable commerce functionality including payment processing/fulfilment, with additional benefits including the ability to provide real-time statistics and data logging capabilities as well as ensuring reliable integration with third party systems.

Figure 5:
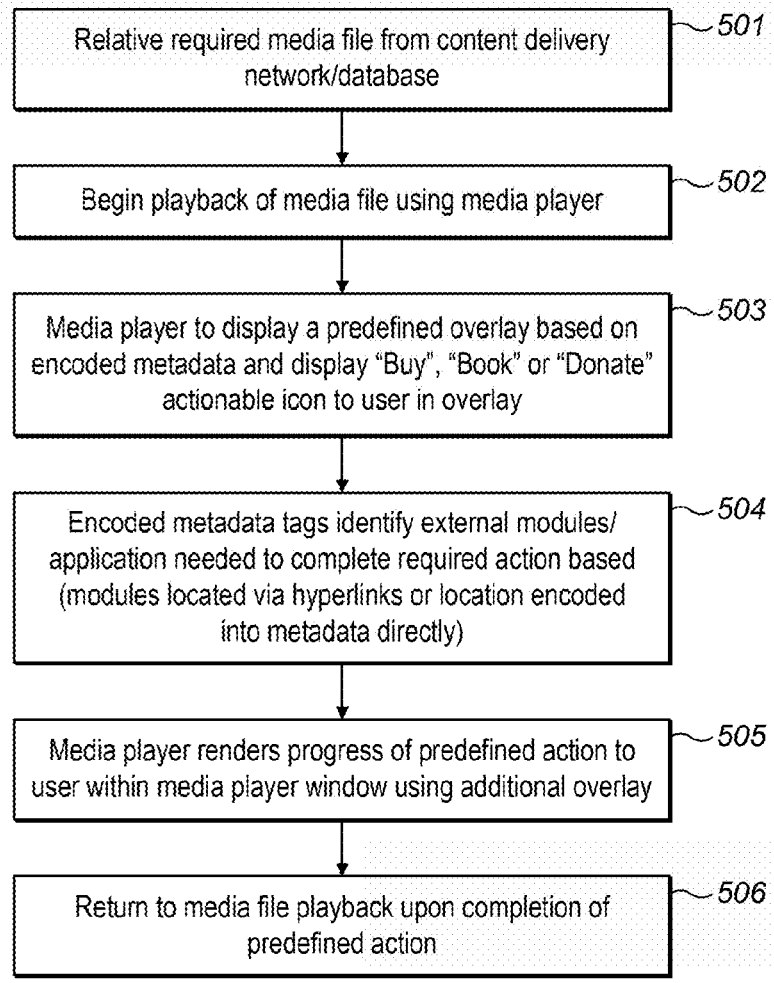
FIG. 5 shows a flow diagram outlining a process for playback of encoded media files including locating external modules and e-commerce applications.

FIG. 5 shows a flow diagram illustrating a process for playback of encoded media files, including locating external modules and applications for providing required functions. The process for playback requires retrieval of the desired media file from the database via the CDN 501. The media player window begins playback of the encoded media file 502, it will be appreciated that the media file can be one of a music video, a film, an advertisement, a video clip or any other rich media file. Upon detecting an encoded cue associated with the media file, the media player is configured to overlay one of several pre-defined screen overlays over the top of the media file payback 503. Loading the required overlay also identifies the necessary external modules that are needed to complete the relevant transaction based on the encoded metadata tags 504. The progress of the selected function is rendered to the user via another overlay which allows the user to complete the necessary transaction 505. Upon completion of the transaction the media player resumes playback of the media file 506.

Figure 6:
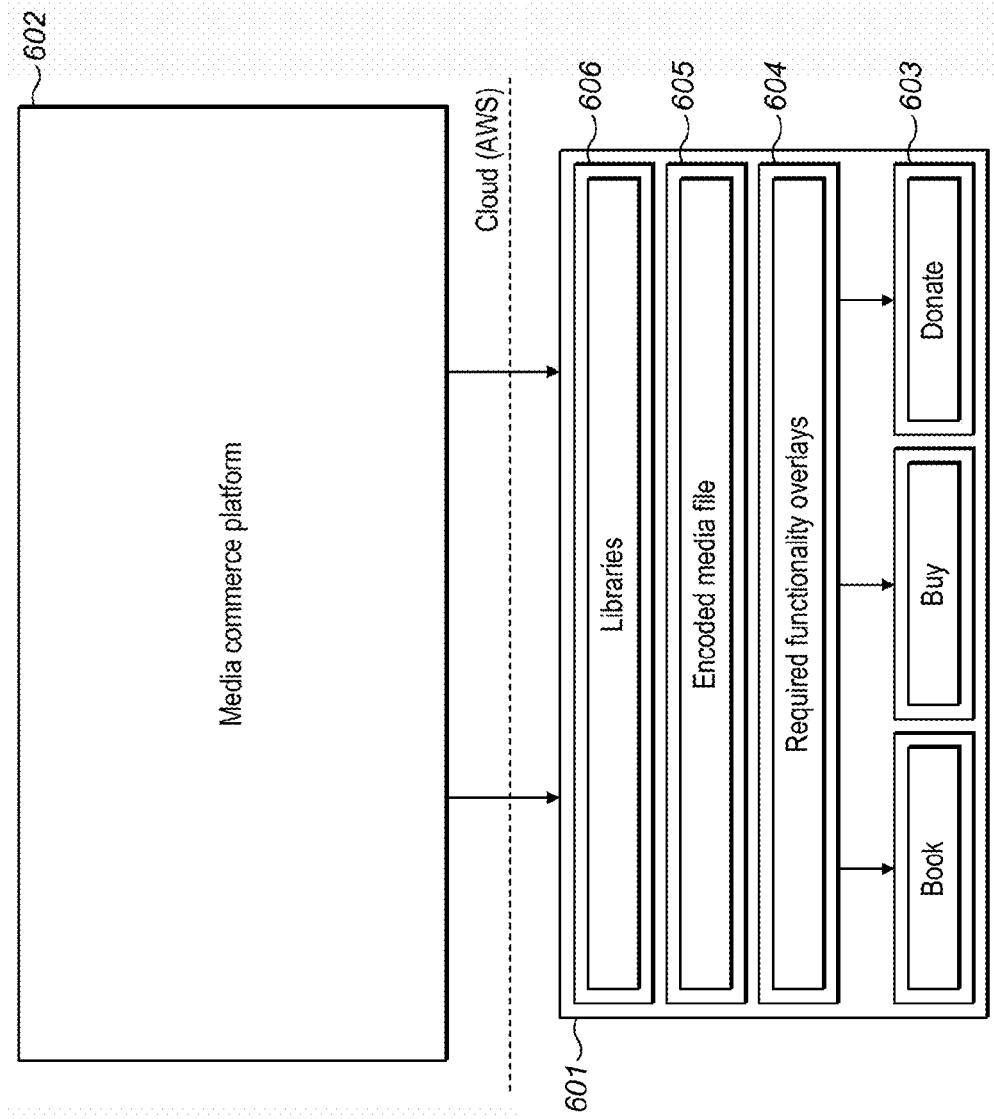
FIG. 6 shows an overview of the player and platform architecture, showing coding layers within an encoded media file; and, FIG. 7 illustrates dataflow between the media player and the e-commerce platform.

FIG. 6 shows an example embodiment of the coding layers within the media player which enable the required functionality to be achieved. The media player 601 is linked to the e-commerce platform 602. The media player has predefined overlays 604 stored which allow the required functions to be realised 603.

The encoded media file causes the relevant overlay to be presented to the user upon detecting the encoded metadata tags in the encoded media file 605 during playback. The metadata tags also direct the media player to load up the required applications and associated content libraries 606 required to deliver the necessary functionality to the user. In one example, the e-commerce and API client libraries as well as the e-commerce functionality are provided by external third-party providers and are integrated into the commerce platform. The example transactions shown in FIG. 6 include, but are not limited to:

1) Making a booking or reservation
2) Purchasing of a product
3) Making a donation The user can use the dashboard to encode data within specified metadata fields for each media file which enables the media player to present playlists to the user. An example of the coding for providing the user with a list of search results is shown below:

```
{
    "videoId":"1",
    "title":"Nile Rogers Live",
    "synopsis":"",
    "dateTime":"1494242000",
    "priority":9,
    "booking_id":[ ],
    "image":"http:\/\/wgs.playrcart.com\/dashboard\/images\/dymanicImages\/large_",
    "sources":[
        {
            "src":"https:\/\/wgs.playrcart.com\/dashboard\/images\/dynamicImages\/vid5e6cc47334c85.mp4",
            "type":"video\.mp4",
            "quality":"medium"
        }
    ],
    Search_engine":""
}
```

Furthermore, each of the media files also has encoded within it, information to identify the type of products/services on offer and the times at which to offer these as described earlier.

One example of how this data is encoded is shown below:

```
{
    "button_title":"Buy Now",
    "checkout_type":"buy",
    "startTime":"21",
    "endTime":"32",
    "product_ids":[3656]
},
{
    "button_title":"Buy Now",
    "checkout_type":"buy",
    "startTime":"32",
    "endTime":"56",
    "product_ids":[3662]
}
```

The above shows an example of providing a "Buy Now" function which starts at time=21 and ends at time=31 and then a second cue which starts at time=32 and ends at time=56. In each of these two cases although the function is the same ("Buy Now"), the product is different and can relate to a product that is visible on the screen at the relevant times defined by the content owner.

In the above example the metadata is encoded using FFmpeg software together with a JSON string encoding scheme. However, any suitable coding scheme can be used to encode the required data.

Figure 7:
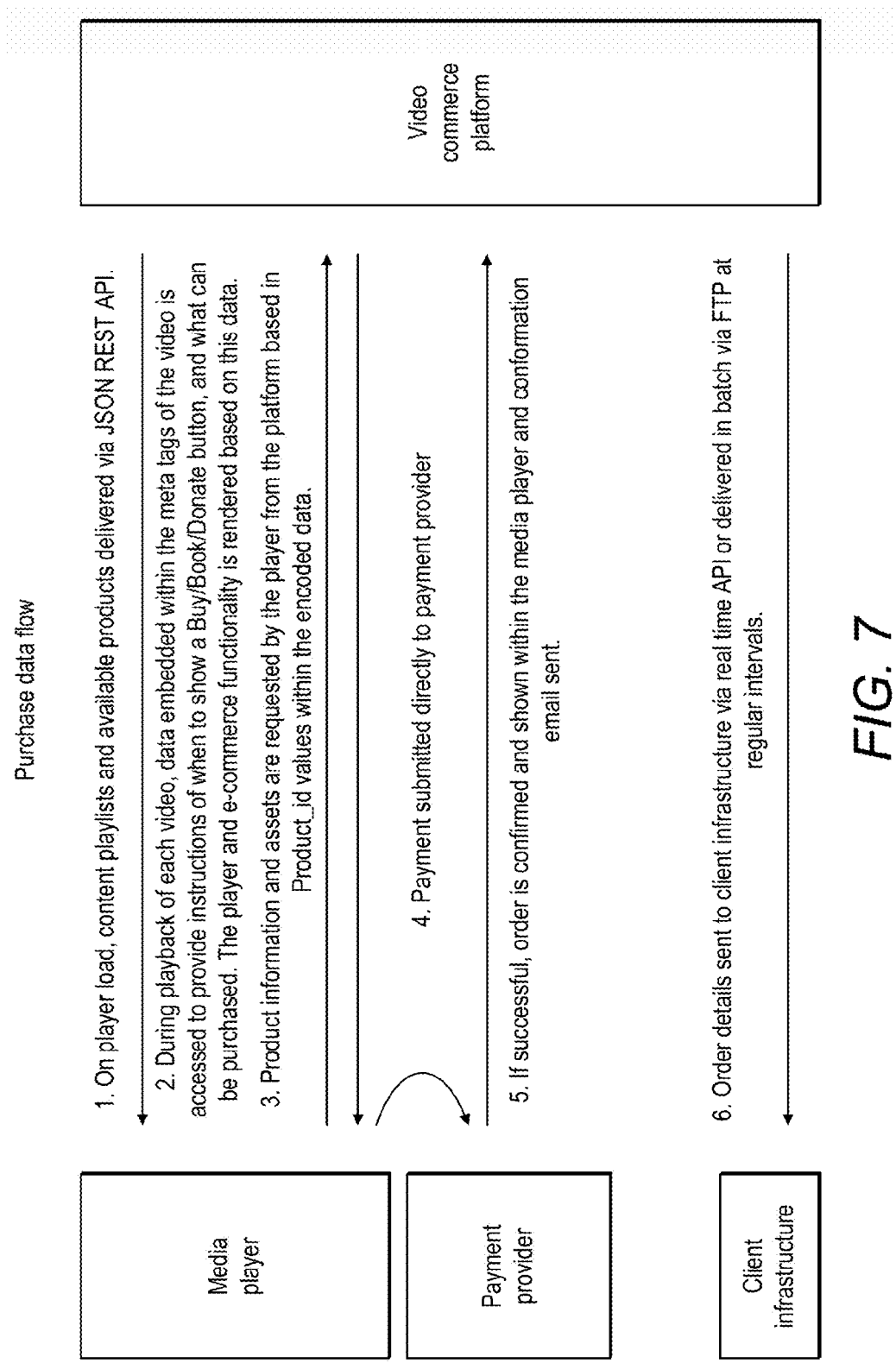

FIG. 7 shows an example embodiment of the dataflow between the media player and the e-commerce platform. The media player is configured to load the required content from the CDN hosted by the e-commerce platform. Once the required media file or a suitable playlist is loaded a user can select a media file to be played.

While a media file is being played back, the encoded metadata tags associated with the cues added by the content owner provide the player with instructions as to when the display should be reconfigured in order to display and subsequently remove dedicated actionable icons to enable the user to interact with and initiate a predefined action, where the actions are associated with the media content being presented at that point during playback of the media file.

The transaction overlay element is also configured to render the progress of the subsequent stages of the commerce action including any payment fulfilment requirements, the progress is rendered via the media player window with all data processing being completed in the background via dedicated APIs and communicated via integration modules. The user is only presented with a summary of the progress and can complete the required action before resuming media file playback upon completion of the transaction.

Any order placement and confirmation emails are subsequently communicated to the user via the existing mechanisms in place with the third party applications being used in the background.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein, and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

The invention claimed is:

1. A method for playback of media files on a media player, comprising the steps of:
retrieving a media file from a file location;
initiating playback of the media file and displaying content on a media player display window;
detecting a first encoded cue associated with a location in the media file;
displaying an interaction overlay element associated with the first encoded cue on the media player display window while the media file is playing;
detecting a user input associated with the interaction overlay element; and,
initiating the display of a transaction overlay element comprising an e-commerce transaction interface for detecting further user inputs within the media player display window and calling a module or application of a platform to conduct a transaction within the media player display window.

2. A method according to claim 1, further comprising the step of detecting a second encoded cue associated with a subsequent location in the media file and removing the interaction overlay element from the media player display window in response.

3. A method according to claim 1, wherein playback of the media file is paused when a user input associated with the interaction overlay element is detected.

4. A method according to claim 1, wherein playback of the media file is resumed upon completion or termination of a transaction within the media player display window.

5. A method according to claim 1, wherein the interaction overlay element is associated with the displayed content of the media file.

6. A method according claim 1, wherein the transaction overlay element relates to a transaction consisting of one or more of: a data submission form, purchasing an item, making a booking, making a donation, and registering for a service.

7. A method according to claim 1, wherein the media file is one of a music video, a film, an advertisement, and a video clip.

8. A method according to claim 1, wherein the media file is a rich media file.

9. A method according to claim 1, wherein the first encoded cue includes one or more of an interaction overlay element title, a transaction type, a product/service identifier, a start time for displaying interaction overlay, and an end time to stop displaying the interaction overlay element.

10. A method according to claim 1, wherein the first encoded cue includes metadata tags which identify one or more of an external integration module, a commerce API, a content API, a payment provider, and a content delivery network.

11. A method according to claim 10, wherein the metadata is encoded using FFmpeg software together with a JSON string encoding scheme.

12. A method according to claim 1, wherein the media player is configured to communicate with one or more external transaction services.

13. A method according to claim 12, wherein the one or more external transaction services includes a payment provider.

14. A computer program product comprising instructions for performing the method of claim 1.

15. A system for playback of media files, the system comprising:
- a media file editor module for encoding cues associated with one or more locations within a media file, the encoded cues being configured to couple to one or more service modules for causing an interaction overlay element to be displayed within a media player during playback of the media file to facilitate transactions within the media player; and,
- a media player comprising computer executable instructions for performing the method of claim 1.

16. A system according to claim 15, further comprising one or more service integration modules selected from a commerce API, a content API, a payment provider, and a content delivery network.

17. A system according to claim 15, wherein the interaction overlay element is associated with the displayed content of the media file.

18. A system according to claim 15, wherein the interaction overlay element is configured to communicate with one or more external transaction services in response to user input to display a transaction overlay element within the media player.

19. A system according to claim 15, wherein the transaction overlay element is an e-commerce transaction interface.

* * * * *